(12) United States Patent
Moles et al.

(10) Patent No.: US 6,596,189 B1
(45) Date of Patent: Jul. 22, 2003

(54) AIRCRAFT RUNWAY DEICING COMPOSITION

(75) Inventors: John O. Moles, Fort Madison, IA (US); John L. Maier, Fort Madison, IA (US); Keith L. Johnson, Mineola, IA (US); Susan D. Royer, Hamilton, IL (US)

(73) Assignee: General Atomics International Services Corporation, San Diego, CA (US)

( * ) Notice: Subject to any disclaimer, the term of this patent is extended or adjusted under 35 U.S.C. 154(b) by 0 days.

(21) Appl. No.: 10/305,934

(22) Filed: Nov. 26, 2002

Related U.S. Application Data

(60) Provisional application No. 60/353,730, filed on Feb. 1, 2002.

(51) Int. Cl.$^7$ ................................................. C09K 3/18
(52) U.S. Cl. ........................................ 252/70; 106/13
(58) Field of Search ............................... 252/70; 106/13

(56) References Cited

U.S. PATENT DOCUMENTS

| | | | |
|---|---|---|---|
| 4,855,071 A | * 8/1989 | Todd et al. | 252/70 |
| 5,132,035 A | * 7/1992 | Hoenke et al. | 252/70 |
| 5,238,592 A | * 8/1993 | Stankowiak et al. | 252/70 |
| 5,496,482 A | * 3/1996 | Bettermann et al. | 252/70 |
| 5,730,895 A | * 3/1998 | Moore | 252/70 |
| 6,156,226 A | * 12/2000 | Klyosov et al. | 252/70 |

* cited by examiner

*Primary Examiner*—Anthony J. Green
(74) *Attorney, Agent, or Firm*—Fitch, Even, Tabin, & Flannery

(57) ABSTRACT

An aqueous liquid aircraft runway deicer composition having minimal catalytic oxidation effect upon carbon-carbon composites which contains between about 20 and about 25 weight % of an alkaline earth metal carboxylate, between about 1 and about 15 weight % of an alkaline earth metal carboxylate, between about 1 and 35 weight % of an aliphatic alcohol, between about 0.01 and about 1 weight % of an alkali metal phosphate, between about 0.01 and about 1 weight % of an alkali metal silicate, and up to about 1% by weight of a triazole. A process for producing such a liquid aircraft runway deicer blends an alkali metal hydroxide, an alkali metal phosphate and an alkali metal silicate in aqueous solution and reacts a carboxylic acid with the hydroxide in the solution to create an alkali metal carboxylate solution at a pH of about 14.2. A minor amount of a triazole is added when the pH is below 15. An aqueous slurry of an alkaline earth metal oxide or hydroxide is reacted with a carboxylic acid to create an aqueous solution of alkaline earth metal carboxylate. These two solutions are blended with an aliphatic alcohol to produce an effective liquid runway deicer having minimal catalytic oxidation effect upon carbon-carbon composites.

16 Claims, 1 Drawing Sheet

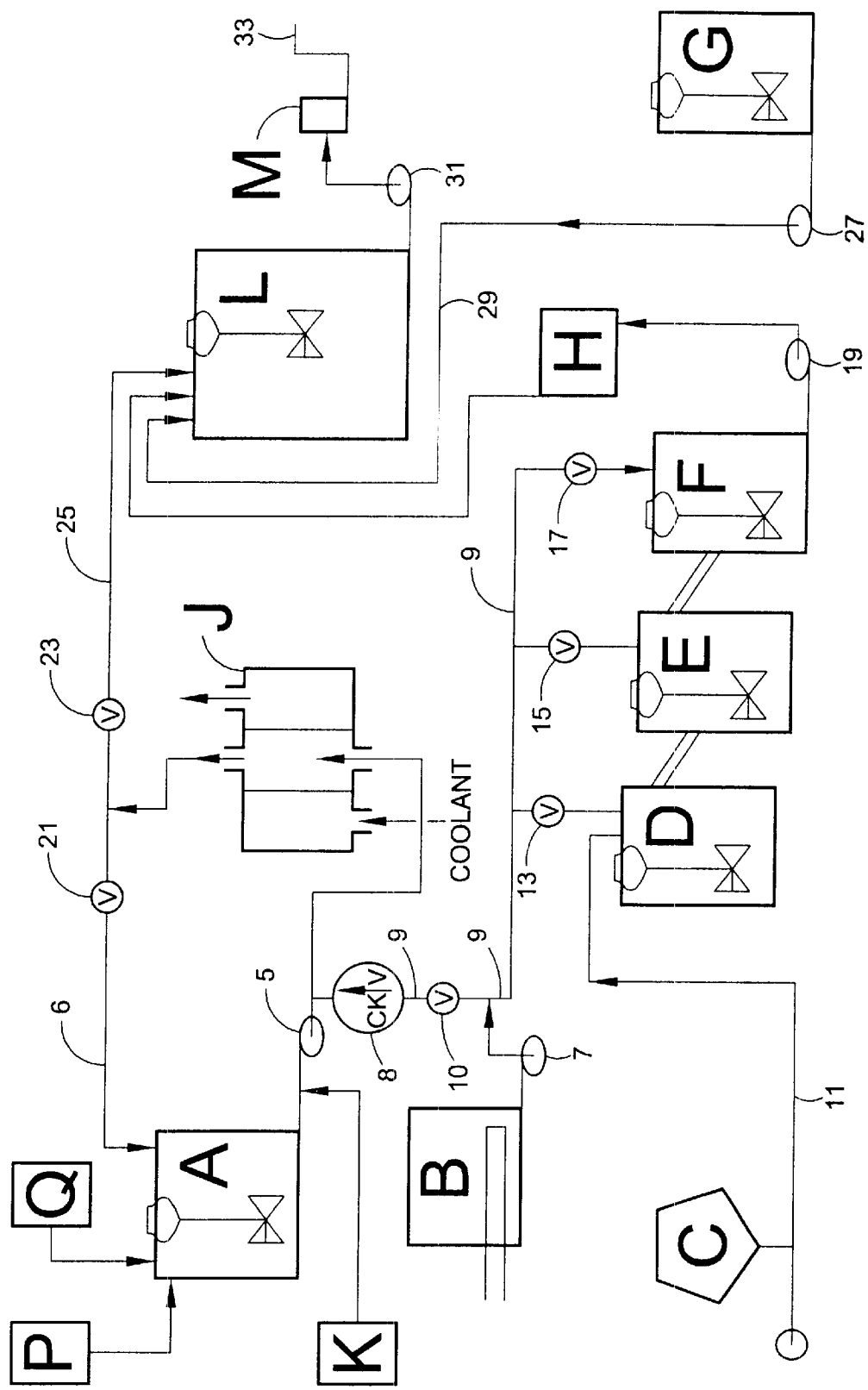

AIRCRAFT RUNWAY DEICING COMPOSITION

This application claims priority from U.S. provisional application Serial No. 60/353,730, filed Feb. 1, 2002, the disclosure of which is incorporated herein by reference.

This invention relates to liquid aircraft runway deicer formulations and more particularly to environmentally friendly deicer formulations that have a minimal effect upon the carbon-carbon fiber composite components in aircraft braking systems and to processes for preparing same. A liquid runaway deicer is defined as composition that is used in conjunction with mechanical means (snow plows, brooms, etc.) to improve the friction of airport pavement surfaces used by aircraft and flight line support equipment during winter operations or other freezing precipitation events.

BACKGROUND OF THE INVENTION

Effectiveness and performance or a runway deicer are generally measured in several ways. First, it must be able to melt ice, which is a function of freezing point, ice melting, ice penetration and ice undercutting. The freezing point temperature of the composition is measured as it is diluted with water (the lower the freeze point, the better the deicer). The minimum requirement for a liquid runway deicing fluid is that it has a freeze point lower than (−)14.5 degrees C. when diluted 1:1 with water by weight (SAE AMS 1435, section 3.2.4). The ability to melt ice is measured by the amount of brine generated per gram of deicer applied. Other measured characteristics are how well the deicer penetrates an ice layer, and how well it spreads to undercut the ice once it penetrates the ice layer and reaches the pavement surface.

Secondly, compatibility with aircraft materials and components is essential. This is generally measured by compliance with certain standard corrosion tests with established limits for corrosion rate and/or affect (AMS 1435).

Thirdly, the environmental effect of the deicer is an important consideration, as it becomes part of the snow and ice runoff and finds its way into soils, storm water, and/or treatment faculties. This characteristic is measured by considering how quickly it biodegrades, its effect on aquatic life and its persistence in the environment.

Finally, it must be commercially viable for the producer and economically acceptable to the user.

Modern carbon-carbon composite braking systems used on aircraft are susceptible to catalytic oxidation at high operating temperatures after exposure to certain alkali and alkaline earth elements. This oxidation results in accelerated brake wear, and runway deicers containing those elements are a source of exposure for aircraft brakes.

U.S. Pat. No. 4,913,831 and U.S Pat. No. 5,132,035 teach calcium magnesium acetate granular materials which are environmentally acceptable compositions but, in some instances, may not act with the desired deicing speed. U.S. Pat. No. 5,064,551 discloses acetate and formate solutions for use as deicers which include metal corrosion inhibitors in the form of phosphates and nitrates with EDTA as a surfactant. U.S. Pat. Nos. 5,350,533 and 5,435,930 teach liquid deicing and anti-icing compositions which include an alkali metal acetate, such as potassium acetate, in combination with corrosion inhibitors, such as phosphate ion, alkali metal silicate and triazoles. U.S. Pat. No. 5,772,912 discloses anti-icing compositions purported to be environmentally friendly which can take the form of a homogenized foam including monohydric alcohols or polyhydric alcohols and/or ethers thereof as a freezing point depressant, in combination with xanthan, as a thickener, and an optional corrosion inhibitor.

All of these compositions have been found to have advantages but to also have certain disadvantages, and as a result, the search has continued for compositions that would be economical, environmentally friendly and have minimal potential corrosive effect upon aircraft carbon-carbon fiber composite braking systems.

SUMMARY OF THE INVENTION

The invention broadly provides pavement deicing and anti-icing compounds, as well as processes for their manufacture, that contain alkali and alkaline earth metal carboxylates and aliphatic alcohols, along with corrosion-inhibiting additives, which are considered to be more compatible with aircraft carbon-carbon composite brake systems than comparable commercially available formulations.

More specifically, the invention provides runway/pavement deicing and anti-icing compounds that contain alkali and alkaline earth metal carboxylates, aliphatic alcohols and corrosion inhibitors that significantly reduce the catalytic oxidation of aircraft carbon-carbon composite brake systems in comparison to comparable commercially available potassium acetate(KAc)-based products, as well as processes for their manufacture.

BRIEF DESCRIPTION OF THE DRAWING

The FIGURE is a flow chart which shows a method for manufacturing an improved liquid runway deicer embodying various features of the invention.

DETAILED DESCRIPTION OF THE PREFERRED EMBODIMENT

A liquid composition is considered to function with minimum effectiveness as a deicer if it exhibits a freeze point lower than (−14.5) degrees C. when diluted 1:1 by weight with water.

Carbon-carbon composites are materials having light weight, high strength and durability which result from the combination of carbon or graphite fibers in a carbon or graphite matrix. They are generally fabricated by multiple impregnations of configurations of carbon fiber networks using liquid carbonizable precursors (e.g. pitch) which are thereafter pyrolized. A significant advantage of carbon-carbon composites is their ability to retain their useful physical properties up to temperatures of about 2760° C. (5000° F.). As a result, they have been found to be excellently suited for use in aircraft braking systems where extremely high temperatures may be developed for short periods of time between the instant the brakes are applied upon landing and the time when aircraft slows to a stop or to taxi speed.

At these high temperatures, however, it has been found that chemical oxidation reactions can occur which are detrimental to the preservation of the desirable physical properties of such carbon-carbon composites, and that such reactions are promoted or catalyzed by the presence of alkali metal elements, such as potassium and sodium. Because it is important that airports operate 12 months a year, runways must be kept clear of snow and ice so that aircraft landings and take-offs can be performed in the winter months. It has thus become essential that anti-icing/deicing compositions be applied to aircraft runways to combat the icing of surfaces of active runways, and the FAA has issued standards that such formulations must meet. The most recent definition of standards for such anti-icing/deicing products is SAE Aerospace Materials Standard No. 1435 (AMS 1435).

It has now been found that liquid runway deicer formulations meeting AMS 1435 can be manufactured which minimize potential catalytic corrosion of carbon-carbon composite braking systems while retaining the desirable qualities of present commercial KAc-based formulations from the standpoint of economical cost, rapid deicing performance and environmental safety. Briefly, it has been found that, by combining such an alkali metal carboxylate with a minor amount of an alkaline earth metal carboxylate, an aliphatic alcohol, and small amounts of corrosion inhibitors, a formulation can be created which retains the desirable characteristics of present commercially available, KAc-based deicers, from the standpoint of economical cost and speed and safety of performance, while at the same time minimizing the potential corrosive catalytic effect on aircraft braking systems.

In order to obtain the rapid freezing point depression desired for an aircraft runway deicer, the product contains a very significant portion of an alkali metal carboxylate, and preferably such is present in greater weight % than any other component of the formulation other than water. Particularly from the standpoint of economy, a potassium or a sodium compound is normally used; however, other alkali metals e.g. lithium, are considered to be equivalents. The carboxylic acid that is used to form the salt is preferably acetic or formic acid, again from primarily economic reasons, as other commonly available acids such as citric, succinic, oxalic, propionic and stearic are considered to be suitable. Whereas present commercial formulations have generally used between about 50 and 60 weight % of potassium acetate or its equivalent, it has now been found that a formulation having comparable performance characteristics from the standpoint of prompt action and low freezing point depression can be obtained with an aqueous solution containing less than 40 weight % alkali metal carboxylate, and preferably less than about 35 weight %. The solution more preferably has between about and about 35 weight percent, still more preferably between about 20 and about 30 weight percent and most preferably about 20 to about 25 weight percent of alkali metal carboxylate, which is most preferably in the form of potassium acetate. This significant reduction in the amount of this constituent compared to commercial deicers is considered to be of major importance. The KAc is preferably formed by reacting KOH with HAc, which economically allows the incorporation of certain inhibitors, as discussed hereinafter.

To obtain comparable desirable performance to that of such commercial pavement deicers which employ 50 to 60 weight % potassium acetate, by using only about one-half that amount, it was found that one could include an alkaline earth metal carboxylate and/or an aliphatic alcohol in appropriate amounts. Generally, it is felt that the alkaline earth metal carboxylate should be employed in an amount not greater than about 95% of the amount of the alkali metal carboxylate, and that, overall, the alkaline earth metal carboxylate may constitute between about 1% and about 25% of the ultimate formulation. Preferably not more than about 15% is used. Unless otherwise stated, all percentages should be assumed to be weight percentages. The aliphatic alcohol may be used in a fairly broad range, and its percentage might even slightly exceed that of the alkali metal carboxylate. Generally, it might range from about 1% to 30 or even 35% of the ultimate liquid formulation, with amounts of between about 8% and about 30% being preferred, and amounts of about 10 to 25% being more preferred.

The alkaline earth metal is preferably magnesium or calcium and more preferably magnesium although other alkaline earth metals, such as barium and strontium, might also be used, they are less preferred from the standpoint of economy. Again, the carboxylic acid may be any of those mentioned above, with acetic acid and formic acid being preferred. The Mg or Ca carboxylate is preferably economically produced by reacting Mg or Ca oxide or hydroxide with acetic or formic acid as described hereinafter. The amounts of the alkaline earth metal carboxylate and the aliphatic alcohol are balanced so as to achieve performance equal to that of a KAc-based deicer composition having perhaps twice as much alkali metal carboxylate; therefore, these two components are used in tandem, so to speak. They may be employed in generally equal amounts, for example, each may be used in about 8 to 15 weight %. Alternatively, the relative amounts of each can be varied significantly with the amount of one being 10 times or more than the amount of the other.

The aliphatic alcohol may be a monohydric or a polyhydric alcohol. Propylene glycol is preferred; however, ethanol, propanol, butanol, isopropanol and other short and medium chain monohydric alcohols, or diols such as ethylene glycol, may be employed, as well as triols such as glycerol. From a cost standpoint denatured ethanol, i.e. ethanol containing about 5% methanol, may be preferred either alone or as a blend with propylene glycol. When reference is hereinafter made to ethanol, it should be understood to include denatured ethanol. As mentioned above, the aliphatic alcohol may be employed in a fairly widely varying amount, from about 1 weight % to an amount even slightly greater than the alkali metal carboxylate, i.e., about 35 weight %. Preferably, propylene glycol and/or ethanol is used in an amount of about 8 and about 15 weight %; however, acceptable compositions may be formulated using, for example, 1.2% and about 30%.

To meet FAA standards, it is important that the formulation include certain inhibitors along the lines of those presently employed in potassium acetate-based commercial pavement deicers which may be thought of as an inhibitor package. These inhibitors will usually include an alkali metal phosphate, an alkali metal silicate and a triazole, with each of the three categories being present in an amount between about 0.01 and about 1 weight %.

Potassium phosphate is the preferred alkali metal phosphate, with sodium phosphate being an alternative. Preferably, potassium phosphate is present in a quantity greater than about 50 PPM and less than about 10,000 PPM, and more preferably between about 500 and 1500 PPM.

The soluble silicate may be a potassium silicate or a mixture of sodium and potassium silicates. These are available in a variety of forms and are commercially known as soluble potash glass and soluble potash water glass. The soluble silicates are generally present in a concentration of between about 100 PPM and about 1000 PPM, and preferably between about 500 and 800 PPM.

The aromatic triazole is preferably provided in the form of a soluble sodium salt, e.g. sodium tolyltriazole; however, aromatic triazoles such as tolyltriazole and benzotriazole may be used. The triazole is preferably present in an amount of at least about 100 PPM and often, preferably, in amounts of about 700 PPM to 1,000 PPM.

The pH of the overall resultant formulation is maintained between about 9.5 and 10.5, and such a neutral-slightly alkaline solution is considered environmentally friendly.

Once the combination of materials that would produce the improved deicer formulation had been determined, it was found that surprisingly they could not be simply all mixed together in a common tank. Attempts to formulate the compositions resulted in unexpected difficulties that were evidenced by incomplete reactions and/or the creation of large amounts of insoluble material, which of course would be a detriment to producing a commercial deicing liquid that needs to be readily applied by spraying or the like. However, repeated efforts successfully arrived at a production process that would economically produce a most acceptable commercial formulation.

It was found that the specialized manufacturing procedure which was developed allowed such formulations to be effectively and economically produced using readily available and reasonably priced raw materials. The FIGURE is a diagrammatic flow sheet of an exemplary process that can be advantageously employed to formulate runway deicer compositions embodying various features of the invention.

The alkali metal carboxylate, e.g. potassium acetate, which will generally constitute the largest single component of the formulation other than water, is illustrated as being produced as a batch reaction in a mixing reactor A which includes a standard mechanical stirrer. A quantity of aqueous potassium hydroxide (KOH) is supplied to reactor A from a tank K; typical batch reaction is to be carried out in reactor A. To maintain the desired temperature in the reactor for the exothermic reaction that will occur, liquid solution is withdrawn from the reactor A by a pump 5 and circulated through a heat exchanger J, which is cooled by a suitable source, e.g. cold water or brine or cryogen, and returned via line 6 to the mixing reactor A as a loop. The phosphate and silicate inhibitors should be added initially to the KOH solution. The triazole is preferably added when the conversion to carboxylate is nearing completion, i.e., after the pH has dropped below 15 and preferably below 14.5. The potassium carboxylate is formed by reaction with a desired aqueous acid solution (e.g. acetic acid, formic acid, succinic acid, etc) which is supplied from tank B, being pumped via a metering pump 7 through a check valve in line 9 and enters into the circulating stream from reactor A at a location just downstream of the pump 5 which is withdrawing solution from the reactor A. The rate of supply of the aqueous acid is regulated to maintain the exothermic reaction (which reaction begins as the mixed stream passes through the cooling heat exchanger J) at or below a desired maximum temperature. Temperature limits are set based upon heat exchange capacity of the cooling heat exchanger J and the materials of construction. Generally, the heat of the circulating stream will be monitored, and it will be maintained between about 50° C. and about 100° C. and preferably between about 65° C. and about 85° C. The batch reaction is monitored via pH in the mixing reactor A. The pH of an aqueous solution of about 45–50 weight % KOH is about 15.6 when read using a standard commercial pH meter, and aqueous acid is supplied by the metering pump 7 until pH monitoring in the mixing reactor A shows that the batch has reached a pH that indicates that substantially all of the potassium hydroxide has been converted to the desired salt. At this time, an off-on valve 10 in the line 9 may be closed to halt the supply of any additional acid to the Reactor A. For example, if acetic acid is being supplied in order to create potassium acetate which has a pH of about 11, as soon as monitoring shows that the pH has dropped below 14.5, e.g. to about 14.4 to 14.0, the supply of acid is halted.

Secondary alkaline earth metal carboxylate production is effectively carried out using a series of three mixing reactors D, E and F via another acid-base reaction. Because the reaction proceeds somewhat slowly, the use of three reactors has proved an efficient way to assure completeness and excellent yield. In this reaction, a solid base, e.g. crystalline magnesium oxide (MgO), is conveyed via a suitable conveyor 11, e.g. a pneumatic conveyor, from a storage bin C and supplied to the top of mixing reactor D where it is slurried in water. Acetic acid from tank B, which is being pumped into line 9 which contains a series of tee connections to allow supply to all the reactors, is added to the mixing reactor D via a control valve 13 at the time when the slurrying is taking place. An initial MgO slurry from the tank D, where the reaction is starting to occur, is allowed to overflow by gravity to reactor E where mixing continues. A more substantial amount of additional acetic acid is supplied from the line 9 through control valve 15 so that the acid-base reaction proceeds in earnest in reactor E. The timing is generally such that the reaction is essentially complete when the liquid is pumped or overflows out of mixing reactor E and enters mixing reactor F. The pH of the mixture in reactor F is closely monitored, and some additional acetic acid from the line 9 is supplied through control valve 17 as desired to reach the pH end point indicative of magnesium acetate. The target pH is 6.8. Although not shown, it should be understood that water may be supplied to mixing reactor F, as well as to either or both of mixing reactors D and E, as needed to adjust to the desired weight % of magnesium acetate (MgAc) to approach a desired target amount of aqueous solution. Once a complete batch is obtained in reactor F, the supply of MgO and acid to reactor D is temporarily halted until the solution of the desired weight percentage is withdrawn from reactor F to formulate a batch of deicer.

The final blending of appropriate quantities of the individual components into the ultimate formulation is carried out in a large mixing tank L. The inhibitors are supplied via tanks P and Q to the mixing reactor A, as described hereinafter. It has surprisingly been found to be important to add the phosphate and silicate inhibitors to the KOH solution in reactor A before any significant amount of the carboxylic acid is added. Aqueous magnesium acetate from mixing reactor F is pumped via a pump 19, through a filter H, to the tank L. By closing a valve 21 in the line 6 leading from the heat exchanger J back to the mixing reactor A and opening a valve 23 in a line 25, the pump 5 can be used to supply the aqueous potassium acetate solution containing at least the phosphate and silicate inhibiters to the mixing tank L.

A small mixing tank G is provided where the preparation of a glycol/alcohol aqueous solution takes place, and the solution is pumped via a pump 27 through a line 29 to the tank L. The pumps 5, 19 and 27 are appropriately regulated so as to supply correctly proportioned amounts of the three chemical components through metering valves (not shown) to the tank L where additional water from a suitable source (not shown) can also be added and where the final thorough mixing takes place.

Once monitoring of the contents of the tank L shows that thorough mixing and the desired composition has been achieved, the ultimate product is pumped by a pump 31 through a final polishing filter M to line 33 leading to the finished product storage.

The following examples provide illustrative processes for producing runway/pavement deicer formulations embodying various features of the invention; however, it should be understood that these examples are generally illustrative of preferred embodiments but are not restrictive of the scope of the invention which is defined in the claims that appear the end hereof.

EXAMPLE 1

In mixing reactor A, an aqueous solution of potassium acetate containing about 50.3 weight % KAc is created by starting with aqueous potassium hydroxide from tank K, which has a pH of about 15.6. An aqueous solution containing potassium phosphate and potassium silicate, which is supplied from tank P in the relative amounts desired in the final batch, is blended therewith. The addition of acetic acid is then begun by operating the pumps 7 and 5 to circulate the reacting liquid mixture through the heat exchanger J in order to maintain the temperature at about 85° C. or below. When about the desired amount of acetic acid has been added to achieve the target pH of about 14.2±0.2, the operation of the pump 7 ceases; however, circulation through the heat exchanger J may continue. At about the time when the end point is nearly reached, the triazole is added from the tank Q. pH continues to be monitored, and should it rise above about 14.2, some additional acetic acid is added to achieve a final pH of about 14.2. Under these circumstances, achieving this pH on the meter, means that the solution is very close to reaching the KAc end point of pH 11 but is desirably still strongly basic which prevents potential precipitation of the inhibitors.

The alkaline earth metal carboxylate production takes place in mixing reactors D, E and F by supplying dry magnesium oxide by a suitable transfer mechanism, such as a pneumatic conveyor 11, to mixing reactor D containing water to create a slurry. Some acetic acid is supplied through the valve 13. Product from mixing reactor D is pumped or allowed to overflow to mixing reactor E where acetic acid is added through valve 15 to achieve a composition close to the final desired. The contents of mixing reactor E are then pumped or allowed to overflow to mixing reactor F where mixing continues, some additional acetic acid is added, and monitoring is carried out to determine the amount of additional acetic acid needed until a final pH of 6.8, plus or minus 0.2, is achieved. The magnesium acetate content is likewise measured, and additional water is added as necessary to produce a 33.7, plus or minus 0.2, weight % solution of magnesium acetate (which is equal to 50.5 weight % of magnesium acetate tetrahydrate).

In tank G, blending of water and propylene glycol is carried out to obtain a 88 to 88.2 weight % aqueous solution of propylene glycol. Appropriate quantities of the contents of mixing reactors A and F and tank G are then simultaneously pumped through metering valves (not shown) to final mixing tank L, with the magnesium acetate stream being pumped through the filter H to remove any inert insoluble material such as might have been present in the commercial magnesium oxide. Blending is carried out using the mixer that forms a part of the tank L to produce a final product containing about 30.1 weight % potassium acetate, 9.1 weight % magnesium acetate, 9.1 weight % propylene glycol, 0.12 weight % potassium phosphate, 0.07% potassium silicate and 0.1% sodium tolyltriazole, with the addition of water as necessary.

Testing of the composition shows that it performs excellently as a pavement/runway deicer. Prototype samples of the composition were submitted for oxidation testing to verify that predicted reduction of catalytic oxygen activity in carbon-carbon composite brakes would result. The results of the testing, compared to a standard potassium acetate-based deicers, were excellent and showed that significant reductions in catalytic activity and resultant oxidation were indeed achieved. The composition meets the criteria for AMS 1435.

EXAMPLE 2

The process steps set forth in Example 1 were repeated; however, the amount of propylene glycol was increased by supplying more of the approximately 88 weight % propylene glycol aqueous solution to the tank L so as to produce a final composition containing propylene glycol in an amount of about 13.2 weight % while the percentages of the other five components remained unchanged.

Testing of this composition likewise showed excellent deicing properties. The same comparative testing was carried out with respect to catalytic oxidation activity, and the results again showed a significant reduction in catalytic activity and resultant oxidation compared to a standard potassium acetate-based deicer. The composition meets the criteria for AMS 1435.

EXAMPLE 3

The process steps generally as set forth in Example 1 were again repeated; however, a greater amount of magnesium acetate solution was pumped to tank L so as to provide 12.6 weight % of magnesium acetate in the final composition. At the same time, less of the polypropylene glycol was pumped from tank G to tank L so that the final composition contained about 1.2% propylene glycol. The weight percentages of potassium acetate and the three inhibitors remained unchanged from Example 1.

Testing shows that the composition retains the excellent deicing properties of that of Example 1. Comparative testing for catalytic oxidation activity shows that this formulation likewise exhibits a significant reduction in catalytic activity and resultant oxidation compared to a standard potassium acetate-based deicer. The composition meets the criteria for AMS 1435.

EXAMPLE 4

The process steps described with respect to Example 1 were again repeated except this time a lesser amount of potassium acetate solution was pumped to tank L so as to reduce the amount of KAc in the ultimate composition to about 25.1 weight %. In addition, the amount of potassium phosphate added to reactor A was slightly increased, and the amounts of potassium silicate and sodium tolyltriazole were decreased. Moreover, the amount of magnesium acetate solution was significantly reduced so that the final composition contained only about 1.3 weight % of magnesium acetate. As a result of these changes, the ultimate formulation contained about 0.2% of potassium phosphate, with the reduced levels of the other two inhibitors being: potassium silicate was about 0.02% and sodium tolyltriazole was about 0.01%. The reduction in the weight of the potassium acetate was compensated for by substantially increasing the amount of propylene glycol so that the ultimate composition contained about 30.1 weight % propylene glycol. Testing again shows that the composition exhibits excellent deicing properties. Standard corrosion tests are run because of the changes in the levels of the three inhibitors; they show corrosion performance sufficient to meet the criteria of AMS 1435. Comparable testing for catalytic activity again shows that the new formulation exhibits a significant reduction in catalytic activity and resultant oxidation with respect to carbon-carbon composites compared to a standard potassium acetate-based deicer.

EXAMPLE 5

The process steps set forth in Example 1 were repeated; however, the propylene glycol was replaced by denatured ethanol (approximately 5 weight % methanol) in aqueous solution in the tank L so as to produce a final composition containing ethanol in an amount of about 9.1 weight %, while the percentages of the other five components remained unchanged.

This composition likewise shows excellent deicing properties, and the composition meets the criteria for AMS 1435.

EXAMPLE 6

The process steps generally as set forth in Example 5 were again repeated; however, a greater amount of aqueous denatured ethanol was pumped to tank L so that the final composition contained about 13.2% ethanol. The weight percentages of the other components remained unchanged from Example 1.

The composition retains the excellent deicing properties and meets the criteria for AMS 1435.

Although the invention has been described with regard to particular illustrative compositions which constitute the best mode presently known to the inventors, it should be understood that various changes and modifications that would be obvious to those having ordinary skill in the art may be made without departing from the scope of the invention which is defined by the claims appended hereto. Unless otherwise specifically stated, all % means weight % and all temperatures are in degrees Centigrade. The disclosures of all U.S. patents mentioned herein are expressly incorporated by reference. Particular features of the invention are set forth in the claims which follow.

What is claimed is:

1. A liquid aircraft runway deicer composition having minimal catalytic oxidation effect upon carbon-carbon composites, which composition comprises:

less than about 40 weight % of an alkali metal carboxylate, between about 1 and about 25 weight % of an alkaline earth metal carboxylate, between about 1 and about 35 weight % of an aliphatic alcohol, between about 0.01 and about 1 weight % of an alkali metal phosphate, between about 0.01 and about 1 weight % of an alkali metal silicate, and between 0.01 and about 1% by weight of a triazole, with the remainder being water, which liquid composition is an effective deicer.

2. The deicer composition of claim 1 which comprises:

between about 20 and about 30 weight % of an alkali metal carboxylate, and between about 1 and about 15 weight % of an alkaline earth metal carboxylate.

3. The deicer composition of claim 2 having between about 8 and about 30 weight % of an aliphatic alcohol.

4. The deicer composition of claim 2 having at least about 700 PPM of a triazole.

5. The deicer composition of claim 4 having between about 8 and 15% of propylene glycol.

6. The deicer composition of claim 4 having between about 8 and 15% of ethanol.

7. The deicer composition of claim 1 which comprises:

between about 20 and about 30 weight % of an alkali metal carboxylate, between about 1 and about 15 weight % of an alkaline earth metal acetate, between about 1 and about 35 weight % of a propylene glycol, between about 0.01 and about 1 weight % of a potassium phosphate, between about 0.01 and about 1 weight % of potassium silicate, and between about 0.01 and about 1% by weight of triazole.

8. The deicer composition of claim 7 which comprises an amount of the alkaline earth metal acetate, which is not more than 95% of the weight of the alkali metal carboxylate.

9. The deicer composition of claim 8 wherein an amount of said propylene glycol approximately equal to the amount of said alkaline earth carboxylate is present.

10. A process for producing a liquid aircraft runway deicer which process comprises the steps of:

(a) blending an alkali metal hydroxide, and minor amounts of an alkali metal phosphate and an alkali metal silicate in aqueous solution, (b) reacting a carboxylic acid with the solution of step (a) to create an alkali metal carboxylate in solution from said hydroxide, (c) reacting an aqueous slurry of an alkaline earth metal oxide or hydroxide with a carboxylic acid to create an aqueous solution of alkaline-earth metal carboxylate, (d) providing an aqueous solution of an aliphatic alcohol, (e) adding a minor amount of triazole to the solution of alkali metal carboxylate created in step (b), and (f) blending the solutions of steps (b), (c) and (d) to produce a liquid runway deicer having minimal catalytic oxidation effect upon carbon-carbon composites.

11. The process of claim 10 wherein an alkali metal hydroxide having a pH above 15 is employed and said reacting step (b) is halted by halting supply of additional carboxylic acid when the pH measures about 14.2±0.2.

12. The process of claim 11 wherein a bath of KOH is reacted by supplying acetic acid in aqueous solution in step (b) and wherein Mg oxide is reacted with acetic acid to create magnesium acetate.

13. The process of claim 12 wherein said triazole is added to the aqueous solution of step (b) after the pH has dropped below 15.

14. The process of claim 12 wherein an amount of KOH is present in said batch that is sufficient to provide an aqueous deicer containing between about 20 and about 30 weight % of potassium acetate.

15. A process for producing a liquid aircraft runway deicer which process comprises the steps of:

(a) blending potassium hydroxide, and alkali metal phosphate and an alkali metal silicate in an aqueous solution having a pH of about 15 or above, (b) reacting acetic acid with the solution of step (a) to create an alkali metal carboxylate solution at a pH of between about 14.0 and about 14.4, (c) providing an aqueous solution of alkaline earth metal carboxylate, (d) providing an aqueous solution of an aliphatic alcohol, and (e) blending the solutions of steps (b), (c) and (d) and a minor amount of a triazole to produce an effective liquid runway deicer of pH of about 9.5 to about 10.5 which has a minimal catalytic oxidation effect upon carbon-carbon composites.

16. The process of claim 15 wherein said minor amount of triazole is blended with the aqueous solution of step (b) when the pH is about 15 or less prior to the blending of the solution of step (b) with either of the solutions of steps (c) and (d).

* * * * *